Figure 1:
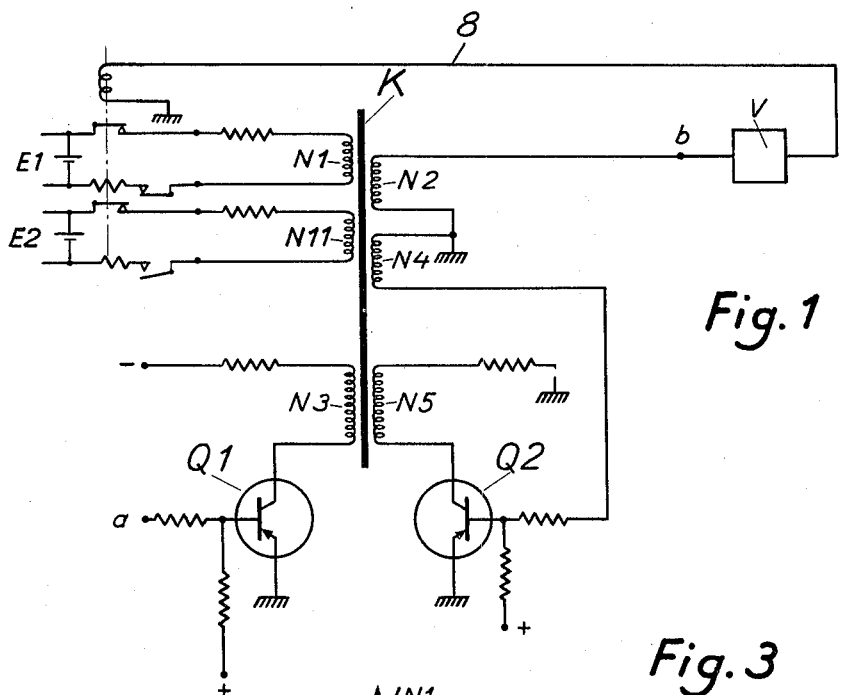

Jan. 11, 1966   C. A. HAGLAND ETAL   3,229,112
ARRANGEMENT FOR CONTROLLING A DIRECT VOLTAGE SOURCE
Filed Nov. 20, 1962

INVENTORS
CLAES ALLAN HAGLAND
SVERRE GEORGE SEM-SANDBERG

BY Hane and Nydick
ATTORNEYS

United States Patent Office 3,229,112
Patented Jan. 11, 1966

3,229,112
ARRANGEMENT FOR CONTROLLING A DIRECT VOLTAGE SOURCE
Claes A. Hagland, Farsta, and Sverre G. Sem-Sandberg, Vendelso, Sweden, assignors to Telefonaktiebolaget L M Ericsson, Stockholm, Sweden, a corporation of Sweden
Filed Nov. 20, 1962, Ser. No. 239,411
Claims priority, application Sweden, Dec. 19, 1961, 12,648/61
3 Claims. (Cl. 307—88)

The present invention refers to an arrangement for controlling a direct voltage source. The arrangement in question is of the kind that comprises a premagnetizable core of a material with marked remanence and saturation properties. The core has several windings, of which a first winding is connectable to the direct voltage source, and a second winding is connectable to a circuit that supervises and/or influences the direct voltage source.

In for instance railway signal systems it is necessary to utilize the fail-safe principle in selecting and interconnecting component.

In railway signal systems employing electronic components direct current controlled units can be utilized. The presence or absence of a direct current as well as its magnitude can be a decisive criterion and determining if a certain railway route may be established, if a signal may be displayed, and so on. Thus there is a demand for a control arrangement, which positively indicates the presence and/or absence of a direct current (or several direct currents) and also that an occurring direct current has a magnitude within certain prescribed limits. Furthermore, this control arrangement must be constructed so that even if a fault would appear within the arrangement, but not in the direct voltage source that is controlled, the indication received from the arrangement or the function carried through by it shall be of such a kind that one is always certain of the measures taken, orders given, etc.

An object of the present invention is to supply an arrangement which satisfies the above requirements.

An arrangement formed according to the invention is characterized by the fact that a third winding among said windings of the core is connected to the output side of a pulse generator, which is arranged to generate a magnetizing field in the core. This field is counter directed and somewhat larger than the magnetizing field that normally is generated by the direct voltage source in the core through said first winding and saturates the core in a certain direction. There are also a fourth and a fifth winding among said windings of the core which are connected to the input side and the output side, respectively of a regenerative reaction amplifier which is arranged to generate a magnetizing field in the core. This field is in the same direction as the magnetizing field from the pulse generator and saturates the core in the opposite direction. Thus output pulses are obtained in said second winding only when the operation of the direct voltage source is normal and there is no fault in any part of the arrangement.

Figure 2:
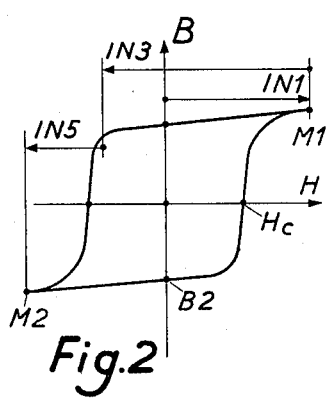
Figure 3:
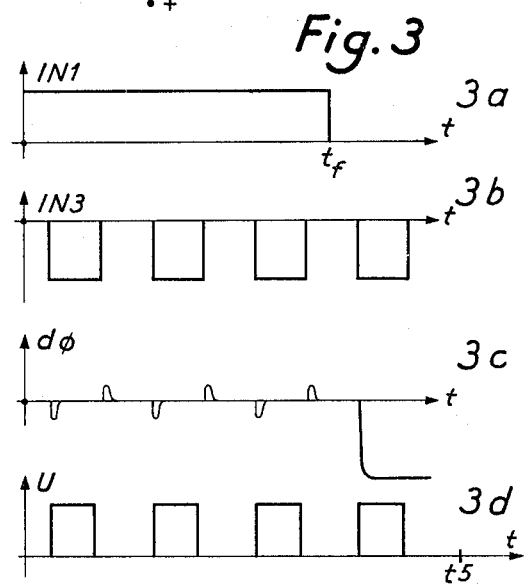
Figure 4:
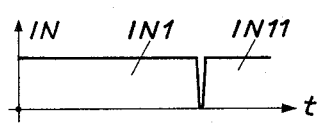

The invention will be further described in connection with the attached drawing, wherein FIG. 1 schematically shows an example of an embodiment of an arrangement according to the invention, FIG. 2 shows the hysteresis loop for the core which enters into the arrangement according to FIG. 1, FIG. 3 shows various waveforms 3a, 3b, 3c, 3d, to facilitate the description of the function of the arrangement according to FIG. 1, and FIG. 4 shows a waveform of the same kind as the waveform 3a in FIG. 3.

The arrangement according to FIG. 1 includes a magnetizable core K, a number of windings N1–N5, wound on this core, a pulse generator Q1, and an amplifier Q2.

The core K is formed of a material with marked remanence and saturation properties, and the hysteresis loop for this material is apparent from FIG. 2. A first winding N1 on the core is connectable to the direct voltage source E1 which is to be controlled. A second winding N2 is connectable to a circuit that supervises and/or influences the direct voltage source, which is for instance, a switch circuit. A third winding N3 is connected to the output side of the pulse generator Q1, having an input terminal which receives a pulse train. A fourth winding N4 and a fifth winding N5 are connected to the input side and the output side respectively of the regenerative reaction amplifier Q2, which generates one and only one impulse every time it is triggered.

The operation of the arrangement will now be described briefly. In normal work, that is, fault-free operation, a magnetizing field IN1 is generated by the direct voltage source E1 through the winding N1 in the core K, which field saturates the core in a certain direction; in FIG. 2 the saturation point is indicated by M1. When a pulse (negative) is fed to the terminal $a$, the pulse generator Q1 generates a magnetizing field IN3 through the winding N3 which field is opposite to and somewhat larger than the magnetizing field IN1. It is clear from FIG. 2 that the field IN3 shifts the magnetic state of the core from the saturation point M1 to the upper left knee part of the hysteresis loop. It is advisable to dimension the components in the arrangement so that the magnitude of the magnetizing field IN3 is about 1.5 times the magnitude of the magnetizing field IN1. In FIG. 3, curve 3a shows the field IN1 as a function of the time $t$, curve 3b shows the field IN3 as a function of the time $t$, and curve 3c shows that at the time of the leading and trailing flanks of the field impulses in curve 3b, small change-of-flux pulses occur in the core K. The change-of-flux pulses are large enough to generate a magnetizing field IN5 via the winding N4, the regenerative reaction amplifier Q2 and the winding N5 of the core K. This field is directed in the same direction as the magnetizing field from the pulse generator Q1 and saturates the core in the opposite direction as that caused by flux IN1. In FIG. 2 this second saturation point is indicated by M2. In this manner an output pulse U is generated in the second winding N2, the output winding. When the negative pulses on the output terminal $a$ cease, the regenerative pulsing through the transistor Q2 ceases and the core K is restored (turned) to the saturation point M1, by the still existing field IN1 generated by the direct voltage source E1. The arrangement is now restored to its initial position. For each incoming pulse to the terminal $a$ the process is repeated, and in that way a series of pulses is obtained at an output terminal $b$ connected to the winding N2 and responsive to the fed pulses, see FIG. 3, waveform 3d.

If for any reason the direct current from the direct voltage source ceases, the first pulse to the input terminal $a$ will as described above generate a first output pulse U, but when the first input pulse ceases the core K is not switched but its magnetic state is now decided by the point B2 on the hysteresis loop in FIG. 2. This means that when the next pulse is received at the terminal $a$, the necessary change in flux for triggering the amplifier Q2 is not generated; thus, no further output pulses are obtained. This case is indicated in FIG. 3, where the field IN1 is supposed to cease at the time $t_f$. After this time only one more output pulse U is obtained, but at the time $t_5$, when normally a pulse would appear, none is obtained. The absence of output pulses is an indication for some fault, and alarm, connection of reserve sets, or other measures can be taken, for instance, by the switch circuit V connected to the output terminal $b$ and controlled by the output pulses. In the drawing there is indicated via, line 8, how the switch circuit V can cause the disconnecting of the direct voltage source E1 after it has been switched over.

In the railway signal system indicated in the introduction, there are instruments which work according to the principle that of two circuits only one at a time shall be current carrying. Thus, if both current circuits are current carrying or if both are non-conducting, there is a state of fault that must be indicated. This case is also handled by the invention. In particular, FIG. 1 shows one more direct voltage source E2, which over a contact shown as open is connected to a winding N11 on the core K. In FIG. 4 there is shown that at a certain time the direct voltage source E1 is supposed to be disconnected and, instead, the direct voltage source E2 to be connected, resulting in the fact that the field IN1 disappears at this time and at the same time as a field IN11 instead influences the core K through the winding N11. As IN11=IN1 nothing in the function of the arrangement is essentially changed, and therefore the pulses U are received at the output terminal b as earlier. If, however, for some reason the two direct voltage sources are connected at the same time, the core K is driven to such a strong saturation that the field IN3 generated by the pulse generator Q1 is not sufficient for generation of the initiating changes in fluxing which trigger the amplifier Q2. Thus no output pulses U are received in this case.

The number of windings on the core K can of course be increased so the arrangement can be used for the case that of $n$ direct voltage sources were $m$ will deliver current and $n-m$ not deliver current at a certain instant of time.

It is readily apparent by examining the arrangement that for internal faults, for instance, a short-circuit in a transistor, a break in a winding and so on, no pulse train will appear at the output terminal b. In the case for instance when there is a short-circuit in a transistor arranged in the regenerative reaction amplifier Q2, so that the winding N5 is always current carrying, the amplifier can never generate a pulse train. If in a corresponding way the winding N3 is always current carrying, the field IN1 is never able to "turn" the core K, and thereby the amplifier Q2 cannot receive the necessary initiated fluxing pulses.

We claim:

1. A circuit arrangement for monitoring a direct voltage source comprising a core of magnetizable material, a first winding means inductively coupled to said core and connected to the direct voltage source for generating a magnetic flux of a given magnitude and given direction in said core as long as said direct voltage source transmits a given current, a second winding means inductively coupled to said core for transmitting output signals related to the condition of the direct voltage source, a third winding means inductively coupled to said core for receiving current pulses for generating pulses of magnetic flux having a magnitude greater than said given magnitude and opposite said given direction, fourth and fifth winding means inductively coupled to said core, and means for regeneratively coupling said fourth winding means to said fifth winding means for causing said fifth winding to generate a pulse of magnetic flux in said core having a direction opposite to said given direction for each change of magnetic flux sensed in said core by said fourth winding means resulting from the interactions of the magnetic fluxes generated by said first and third winding means.

2. A circuit arrangement for monitoring a direct voltage source comprising a core of magnetizable material having substantial remanence and saturation properties, a first winding means on said core connected to said direct voltage source and generating a magnetic flux in said core having a given magnitude and direction which saturates said core in a first direction as long as said direct voltage source transmits a given current, a second winding means on said core for transmitting signals related to the condition of said direct voltage source as indicated by changes in the magnetic flux in said core, a third winding means on said core for receiving current pulses for generating pulses of magnetic flux in said core having a direction opposite said given direction and a magnitude greater that said given magnitude but less than that which saturates said core in a second direction, fourth and fifth winding means on said core, regenerative means connecting said fourth winding means to said fifth winding means for causing said fifth winding to generate a pulse of magnetic flux in said core which has a magnitude and direction to saturate said core in a second direction only in response to changes in the magnetic flux sensed by said fourth winding means resulting from the interaction of each magnetic flux pulse generated by said third winding means on the magnetic flux generated by said first winding means.

3. The arrangement according to claim 2, wherein the magnitude of the magnetic flux generated by the third winding means is one and one-half times greater than the magnitude of the magnetic flux generated by said first winding means.

References Cited by the Examiner
UNITED STATES PATENTS 1,706,022   3/1929   Clark et al.
2,831,985   4/1958   Eckert.

SAMUEL BERNSTEIN, *Primary Examiner.*

J. D. TRAMMELS, *Assistant Examiner.*